Feb. 7, 1967 S. B. TOPF 3,302,508
TOGGLE BOLT
Original Filed March 26, 1964
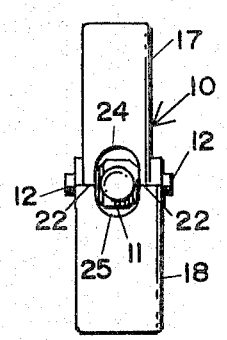
FIG.2
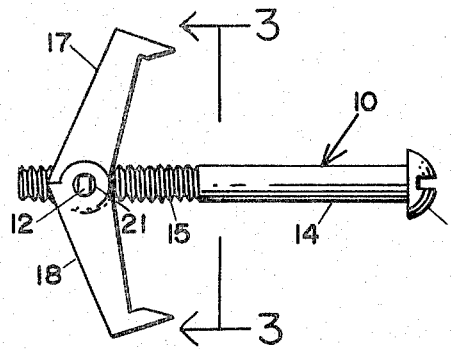
FIG.1
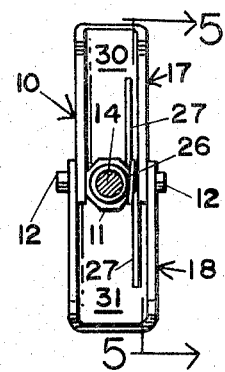
FIG.3
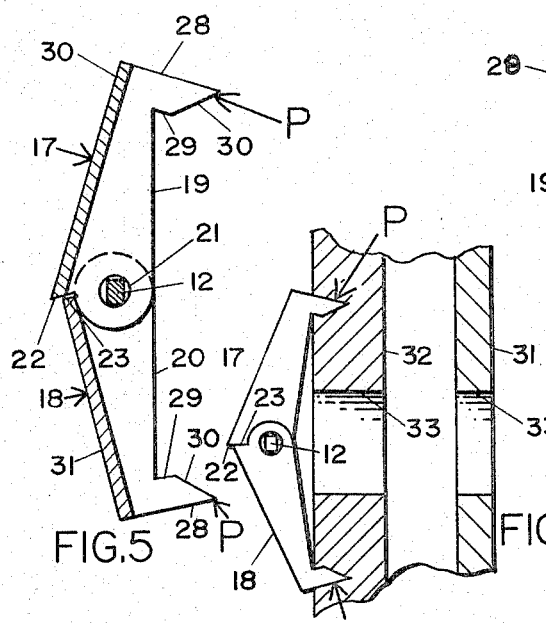
FIG.5
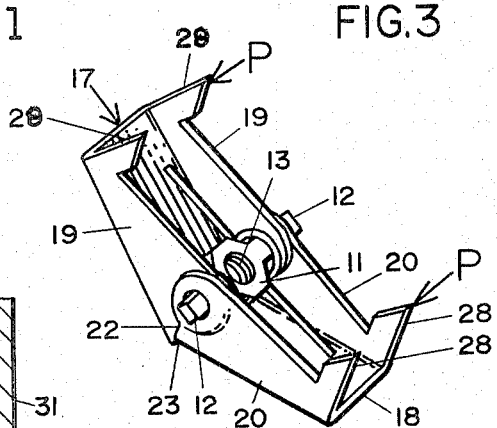
FIG.4
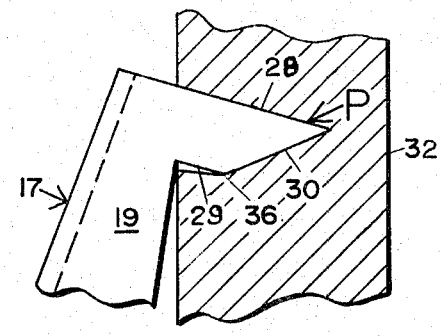
FIG.7
FIG.8
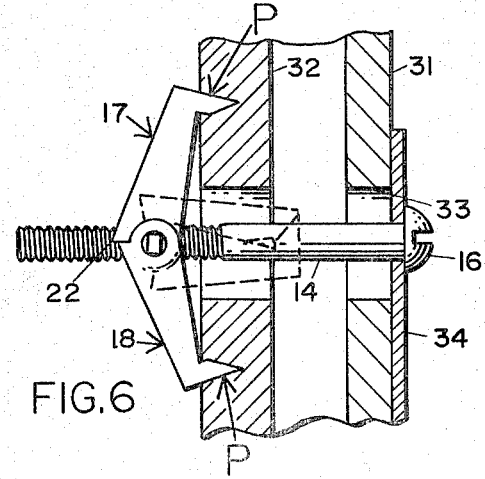
FIG.6
INVENTOR.
SAM B. TOPF
BY
Salvatore G. Militana
Attorney

United States Patent Office 3,302,508
Patented Feb. 7, 1967

3,302,508
TOGGLE BOLT
Sam B. Topf, Coral Gables, Fla., assignor of one-half to Louis Rolnick, Miami Beach, Fla.
Continuation of application Ser. No. 354,903, Mar. 26, 1964. This application Mar. 15, 1966, Ser. No. 543,445
1 Claim. (Cl. 85—3)

This invention relates to fastening devices and is more particularly directed to toggle bolts. This application is a continuation of my copending application Serial Number 354,903, filed on March 26, 1964, now abandoned, for Toggle Bolt.

A principal object of the present invention is to provide the wings of a toggle bolt with prongs or locking teeth which becomes imbedded in a wall when the bolt is pulled or tightened whereby the wings remain on the wall even after the bolt has been removed from the wall.

Another object of the present invention is to provide a toggle bolt having pivoted wings with prongs mounted on the free ends of the wings for securing the wings to the wall thereby permitting reuse of the wings.

A further object of the present invention is to provide a toggle bolt having pivoted wings with shoulders at their inner ends abutting against each other at their open position and with enlarged recesses to permit the bolt to extend therethrough without the possibility of spoiling the threads on the bolt.

A still further object of the present invention is to provide a toggle bolt with extended prongs thereon that will become imbedded in a wall upon pulling on the bolt and making it easier to tighten the bolt as the wings cannot rotate and will remain in position on the wall resisting forces to dislodge the toggle bolt from its position on the wall.

With these and other objects in view, the invention will be best understood from a consideration of the following detailed description taken in connection with a drawing transferred from my copending application No. 354,903, filed on March 26, 1964, for Toggle Bolt, forming a part of this specification, with the understanding, however, that the invention is not confined to any strict conformity with the showing of the drawing but may be changed or modified so long as such changes or modifications mark no material departure from the salient features of the invention as expressed in the appended claim.

In the drawing:

FIGURE 1 is a side elevational view of a toggle bolt constructed in accordance with my invention.

FIGURE 2 is a front elevational view thereof.

FIGURE 3 is a sectional view taken along the line 3—3 of FIGURE 1.

FIGURE 4 is a perspective view of the toggle bolt shown with the bolt removed.

FIGURE 5 is a cross sectional view taken along the line 5—5 of FIGURE 3.

FIGURE 6 is a cross sectional view of a wall showing my toggle bolt in position thereon.

FIGURE 7 is a similar view with the bolt removed showing the wings remaining imbedded on the wall.

FIGURE 8 is an enlarged fragmentary view showing a prong imbedded in the wall.

Referring to the drawing wherein like numerals are used to designate similar parts throughout the several views, the numeral 10 refers to a toggle bolt embodying my invention and consisting of a nut 11 having a pair of oppositely extending and aligned trunnions or lugs 12 and a threaded opening 13. An elongated screw bolt 14 having a threaded body 15 and a screw head 16 is threadedly received by the threaded opening 13 of the nut 11. Pivotally mounted on the lugs 12 are inner and outer wings 17 and 18 respectively, each being U-shaped in cross section with main walls 130 and 31 and side wall portion 19 and 20 at right angle thereto. The side wall portions 19 and 20 are provided with bores 21 for receiving the lugs 12 and permitting the pivotal movement of the wings 17 and 18 about the lugs 12. As shown by FIGURE 6, the extreme limits at which the wings 17 and 18 may swing are shown by both the dotted and solid line position. The wings 17 and 18 are provided with a pair of shoulders 22 and 23 respectively which engage each other when the wings 17 and 18 have pivoted to their extended positions. Somewhat semi-circular openings 24 and 25 positioned between the shoulders 22 and 23 respectively on the wings 17 and 18 permit the threaded body 15 of the screw 14 to pass therealong without engaging the wings 17 and 18 or hampering the pivotal movement thereof. The opening formed by the semi-circular openings 24 and 25 is considerably larger than the diameter of the bolt 14 so that bolt 14 is capable of swinging in a large arc about the pivot lugs 12 without engaging the wings 17 and 18. A spring 26 coiled about one of the lugs 12 adjacent the side wall 19 of the inner wing 17 is provided with arm portions 27 which impinge on the inner surfaces of the wings 18 and 19. The arm portions 27 of the spring 26 are tensioned to swing in an outwardly direction whereby the wings 17 and 18 are yieldingly urged to their extended position as shown by all of the figures and by the solid lines in FIGURE 5. At the ends of each of the side walls 19 and 20 of the wings 17 and 18 respectively there are prongs —P—.

The prongs —P— which are relatively long and sharp are provided with an outer edge portion 28 that is at approximately right angle to the main wall, an inner edge portion 29 parallel thereto with a tapered edge 30 joining the edge portions 28 and 29. An angular portion 36 which is formed at the juncture of the edge portions 28 and 30 resists the outward movement of the prongs —P— as is explained in greater detail hereinafter.

As best shown by FIGURES 6 and 7, the toggle bolt 10 is inserted into an opening 33 in a wall 31, 32 after a member 34 to be supported by the toggle bolt 10 had been positioned on the bolt 14. After the wings 17, 18 have emerged past the inner surface of the wall portion 32, the spring 26 will cause the wings 17, 18 to pivot outwardly to their extended position. Now the screw 14 is pulled bodily to cause the prongs —P— to become embedded on the inner surface of the wall 32. The screw bolt 14 is now rotated to cause the threaded body 15 to thread itself forwardly in the nut 11. When the screw bolt 14 is rotated, since the wings 17, 18 cannot rotate, the screw bolt 14 will become threaded on the nut 11 to become tightened against the wall portion 31 and member 34 where the member 34 is properly supported. Likewise, if it is desired to remove the member 33 from the wall 31, the bolt 14 is readily unthreaded from the wings 17, 18 inasmuch as the wings 17, 18 are held in a stationary manner by the prongs 28, 29 firmly imbedded in the wall portion 32. The wings 17, 18 will remain in position on the wall as shown by FIGURE 7. When it is desired to reuse the toggle bolt 10, all that need be done is insert the screw bolt 14 through the openings 33, 33 into the nut 11 and thread the screw bolt 14 in the bore 13 of the nut 11. Using ordinary force to align the threaded bore 13 with the threads 15 of the screw bolt 14 will not cause the dislodgement of the wings 17, 18 from the wall 32 since the prongs —P— are imbedded deeply in the wall 32. Since the recesses 24 and 25 form an opening considerably larger than the diameter of the screw bolt 14, the walls 130 and 31 of the wings 17 and 18 will not be engaged by the screw bolt 14 at whatever angle the nut 11 is pivoted by virtue of the angle of approach of the screw bolt 14 may be. In the conventional toggle bolts removal of the screw bolt normally causes the wing portions to drop from their position on the wall or when an attempt is being made to return the screw bolt to its position in the nut, upon contacting the nut with the end of the screw bolt the wing portions will be disturbed and the wing portions will be jarred loose from the wall and drop from its position.

Inasmuch as the only force that will be normally applied on the wing portions 17 and 18 is by means of the screw bolt 14 engaging the nut 11, the shape of the prongs —P— assist in preventing the dislodgment of the wing portions 17 and 18. A force applied against the nut 11 will tend to cause the wing portions 17 and 18 to pivot about the lugs 12. However, since the prongs —P— are deeply embedded in the wall 32, any pivotal movement of the wing portions 17 and 18 however slight, will cause the angular portion 36 formed at the juncture of the edges 29 and 30 to engage the wall 32 and resist outward movement of the pongs —P—. Obviously, if the arm portion 17 and 18 were forced outwardly away from their position on the wall 32 without any tendency to pivot or swing about the lugs 12, there would be no resistance applied by the angular portion 36 against removal of the prongs —P— from the cavity made by the prongs —P— on their becoming embedded into the wall 32.

Obviously, the specific form and details of the wings 17 and 18 as illustrated in the drawings and described above are not important as long as these wings are pivoted on the nut of the toggle bolt and are normally biased to swing to opposite sides thereof to a fully extended position and the prongs at the outer ends of these wings are adapted to firmly embed themselves in the back of the wall in which the toggle bolt is mounted when it is drawn up tight in the nut, so that when it is thereafter removed, the nut will be dislodged because it will be pivotally supported by the wings with their prongs still firmly embedded in the back of the wall. The bolt may thus be reinserted in the nut whenever it may be necessary to mount it in the same place again, and a new nut with wings does not have to be installed, as was conventionally required in the use of previous toggle bolts everytime a bolt was removed and reinstalled.

To further increase the firmness of the embedment of the prongs, as pointed out above, their inner sides are pointed slightly inwardly toward each other, so that when the prongs are fully embedded, and force on the nut such as would be applied by screwing the bolt into it during reinstallation would tend to draw the points of these inner sides toward each other to increase their grip into the back of the wall before pulling them out of their embedment.

What I desire to secure by Letters Patent of the United States is:

A toggle bolt having a nut, a screw having a head portion at one end threadedly mounted in said nut along the other end, said nut having a pair of lugs extending in opposite directions and in substantially coplanar relationship, a pair of wing members, said wing members having an elongated main wall portion with side walls extending at substantially right angles along edges of said main wall portion, said side walls having a bore for pivotally mounting said wing members on said lugs, said main wall portions having a substantially semi-circular opening along one end thereof permitting said screw to pass freely therethrough, said end of said main wall portions having shoulders which engage each other to limit the swinging movement of said wing members, spring means mounted on one of said lugs and engaging said wing members yielding urging said wing members to swing to their extended position and prong members mounted in substantially coplanar relation with said side walls at said other end of said wing members and extending beyond said side walls toward said head portion of said screw, said prongs each having an outer edge portion extending at substantially a right angle to said main wall portions, an inner edge portion substantially parallel to said outer edge portion, and an inclined edge portion forming a substantially acute angle with said outer edge portion and an obtuse angle with said inner edge portion for resisting the outward movement of said prongs from the wall resulting from pushing said nut inwardly thus causing the prongs to more firmly grip the wall between them.

References Cited by the Examiner

UNITED STATES PATENTS

| | | | |
|---|---|---|---|
| 1,168,257 | 1/1916 | Kennedy | 85—3 |
| 1,228,512 | 6/1917 | Zifferer | 85—3 |
| 2,616,327 | 11/1952 | Karitzky | 85—3 |
| 3,170,361 | 2/1965 | Vaughn | 85—3 |

FOREIGN PATENTS

| | | |
|---|---|---|
| 591,949 | 9/1947 | Great Britain. |

CARL W. TOMLIN, *Primary Examiner.*

R. S. BRITTS, *Assistant Examiner.*